Patented Mar. 3, 1942

2,275,088

UNITED STATES PATENT OFFICE 2,275,088

MANUFACTURE OF BESSEMER STEEL

Peer D. Nielsen, Lorain, Ohio, assignor to National Tube Company, a corporation of New Jersey No Drawing. Application April 8, 1941, Serial No. 387,509

7 Claims. (Cl. 75—60)

In accordance with the present invention, there are provided certain improvements in the economic production of seamless tubes in large amounts, from steel made in a Bessemer converter instead of the more expensive open hearth furnace or electric furnace, when the making of the tubes includes the step of piercing solid billets in a seamless tube piercing mill.

Steel produced in a Bessemer converter contains large amounts of oxygen, normally necessitating its being processed as either a rimming or a conventionally capped steel that is not adapted for use in conjunction with the billet piercing step, insofar as the economical quantity production of seamless tubes is concerned. The steel cannot be satisfactorily "killed" by ordinary deoxidization procedure using such deoxidizers as silicon and aluminum only, because it contains so much oxygen that when deoxidized by these materials alone, to the extent required by a steel which is to be processed into seamless tubes, the products of deoxidization formed are so great in amount as to render the steel unsuitable for the intended use.

Various methods have been proposed for effecting this deoxidation; and it is the principal object of the present invention to effect improvements on the foregoing proposed methods, wherein a substantially complete deoxidation of the metal is effected in a highly expeditious manner.

According to the present invention, the step of making the steel is carried out in a particular manner in a Bessemer converter with its attendant economies of time and money. The metal is poured into a ladle and deoxidized with carbon or a carbon-rich material until it is brought to a degree of oxidation not exceeding that of steel made in a basic open hearth furnace, the deoxidizing operation being controlled so as not to adversely increase the carbon content of the steel to a degree which would render the steel unduly hard for the piercing operation.

The invention will be understood from the following specific example:

Molten pig iron in an amount of from 34,000 to 35,000 pounds is charged to a Bessemer converter, together with any necessary cooling additions of cold iron, scrap, or scale, or any combination of these, for the production of three ingots measuring 23½ inches x 26½ inches x 80 inches, weighing a total of 31,300 pounds. This charge is blown as in the usual converter practice to a point 10 to 15 seconds beyond the first change observable in the flame at the end of the boil period. At this point the residual carbon in the metal is about 0.04 per cent and the residual manganese is approximately 0.04 per cent. It is preferred to use as starting material, an iron which will result in a sulphur content in the finished steel of less than 0.035 per cent.

After completion of the blow, metal is poured slowly from the converter into a ladle. When a small amount of metal is contained in the ladle, an addition of petroleum coke is started. Coke is added in three separate amounts of approximately 18 pounds each, allowing a short interval to elapse between each addition for the ladle reaction to subside. After the reaction from the last addition of coke has subsided, an addition is made of approximately 225 pounds of 80 per cent ferro-manganese, 70 pounds of 90 per cent ferro-silicon, and 65 pounds of aluminum, care being taken to add all additions to the stream of metal issuing from the converter and in a manner as to prevent entrapment in the ladle slag.

The ladle is approximately two-thirds full when these additions are completed, and at that time the pouring is interrupted to allow a thorough stirring of the ladle contents by poling with long "green" poles to effect a thorough mixing of the additions and the blown metal and to assist in the elimination of the products of deoxidation. After the poling, the ladle is filled quickly with the remaining converter metal to agitate further the metal in the ladle to promote mixing of the ladle contents.

The thoroughly deoxidized and degasified steel resulting from the foregoing procedure then is poured into ingot molds in accordance with standard procedure, preferably, however, in hot top ingot molds in order to obtain the best yields in subsequent rolling operations.

The resulting steel assays as follows:

Carbon _____ per cent__ 0.10 –0.50
Silicon _____ do____ 0.180–0.230
Phosphorus____per cent maximum__ 0.07
Manganese_____per cent 0.45 –0.65

A petroleum coke addition of 55 pounds to 31,300 pounds of steel would result in an increase in carbon content of 0.175 per cent if all the carbon remained in the steel. As residual carbon in the blown metal is 0.04 per cent and carbon added by the ferro-manganese is about 0.05 per cent, only about 0.06 per cent of carbon is added to the steel from the coke addition. Thus only one-third of the addition contributes to increasing the carbon content of the metal and two-thirds of the addition combines with oxygen. A considerable part of this remaining two-thirds reacts directly with oxides in the steel, thereby effectively deoxidizing it.

For the manufacture of seamless tubes from Bessemer steel as described above, the subsequent rolling operations involved in making blooms, billets, piercing the billets in a seamless tube piercing mill, and processing the pierced billets into finished seamless steel tubes, are performed in the same manner as is done in the production of such tubes from steel made either by open hearth or electric furnace practice.

While petroleum coke is the preferred carbonaceous material, other carbon-rich materials may be used. For example, the petroleum coke may be replaced with by-product coke breeze or anthracite coal. Petroleum coke is preferred, however, because of its high carbon and low ash content (total carbon, 99.35 per cent; ash, 0.65 per cent).

I claim:

1. The process of preparing Bessemer steel for the production of seamless tubes, which comprises blowing in a converter a charge of pig iron until the carbon content of the resulting steel is reduced to substantially 0.04 per cent, slowly pouring the major portion of the steel from the converter into a ladle, adding to the steel in the ladle during the pouring successive portions of carbon to effect a substantial preliminary deoxidation of the steel, adding to the steel from the converter during pouring recarburizing and deoxidizing reactants to recarburize and substantially completely deoxidize the entire amount of steel in the converter, controlling the additions of carbon and recarburizing reactant so as to avoid a carbon content in the final steel of more than substantially 0.50 per cent, and after the complete addition of the carbon and reactants to the steel in the ladle, rapidly pouring into the ladle the remaining steel in the converter to effect a mixing of the steel and the said reactants.

2. The process of preparing Bessemer steel for the production of seamless tubes, which comprises blowing in a converter a charge of pig iron until the carbon content of the resulting steel is reduced to substantially 0.04 per cent, pouring steel slowly from the converter into a ladle, adding carbon in installments to the steel in the ladle after successive portions of the steel have been poured, continuing the slow pouring of the steel after subsidence of reaction following addition of the last installment of carbon, adding to the stream of steel pouring from the converter, recarburizing and deoxidizing reactants in amounts sufficient to substantially completely deoxidize all of the steel in the converter and to produce a total carbon content in the said steel of not more than substantially 0.20 per cent, interrupting the pouring after all of the said reactants have been added, effecting a thorough mixing of all of the reactants and the steel in the ladle, and rapidly pouring into the ladle the steel remaining in the converter after the interruption of the pouring, thereby producing a thorough mixing of the steel with the said reactants.

3. The process of preparing Bessemer steel for the production of seamless tubes, which comprises blowing in a converter a charge of pig iron until the carbon content of the resulting steel is reduced to substantially 0.04 per cent, pouring steel slowly from the converter into a ladle, adding carbon in installments to the steel in the ladle after successive portions of the steel have been poured, continuing the slow pouring of the steel after subsidence of reaction following addition of the last installment of carbon, adding to the stream of steel pouring from the converter into the ladle recarburizing and deoxidizing reactants in amounts sufficient to substantially completely deoxidize all of the steel in the converter, controlling the additions of carbon and the recarburizing to produce a total carbon content in the finished steel of not more than substantially 0.50 per cent, interrupting the pouring after all of the said reactants have been added, poling the steel and reactants in the ladle with green poles to effect a thorough mixing of the steel and reactants and rapidly pouring into the ladle the steel remaining in the converter after the interruption of the pouring, thereby producing a thorough mixing of the steel with the said reactants.

4. The process of preparing Bessemer steel for the production of seamless tubes, which comprises blowing in a converter a charge of pig iron until the carbon content of the resulting steel is reduced to substantially 0.04 per cent, pouring steel slowly from the converter into a ladle until the ladle contains a small quantity thereof, adding an installment of petroleum coke to the steel in the ladle, alternately adding to the ladle further installments of steel and petroleum coke until sufficient of the latter is present in the ladle to effect a substantially complete preliminary deoxidation of the steel, slowly pouring additional steel from the converter in a stream into the ladle, adding to the stream reactants composed of ferro-manganese, ferro-silicon and aluminum in amounts sufficient to cause the finished steel to assay substantially carbon, 0.10–0.50 per cent; silicon, 0.180–0.230 per cent; manganese, 0.45–0.65 per cent, together with not more than 0.035 per cent of sulphur and not more than 0.075 per cent of phosphorus, interrupting the pouring of the steel following completion of addition of the said reactants, poling the steel and reactants in the ladle with green wooden poles until thoroughly mixed, and rapidly pouring remaining steel from the converter into the ladle after completion of the poling.

5. The process of preparing Bessemer steel for the production of seamless tubes, which comprises blowing in a converter a charge of pig iron until the carbon content of the resulting steel is reduced to substantially 0.04 per cent, pouring the steel slowly from the converter into a ladle until the ladle contains a small quantity thereof, adding an installment of carbon as a material selected from the class consisting of petroleum coke, coke breeze and anthracite coal, effecting a preliminary deoxidation of the steel with the said carbon, treating the said steel after the deoxidation with recarburizing and deoxidizing reagents by adding the reagents to a slow stream of the steel being poured from the converter to the ladle, timing the addition of reagents to the pouring so that a substantial amount of steel remains in the converter after the reagents have been completely added, interrupting the pouring upon complete addition of the reagents, intimately stirring the steel and reagents in the ladle, and thereafter rapidly pouring the remaining steel from the converter into the ladle, the addition of free carbon to the steel and the recarburization of the said steel being controlled to avoid producing a carbon content in the final steel of not more than substantially 0.16 per cent.

6. The process of preparing Bessemer steel for the production of seamless tubes, which comprises blowing in a converter a charge of pig iron until the carbon content of the resulting steel is reduced to substantially 0.04 per cent, pouring the steel from the converter into a ladle until the ladle contains a small quantity thereof, adding to the steel in the ladle an installment of petroleum coke, adding alternate quantities of steel and petroleum coke to the ladle to effect a preliminary substantially complete deoxidation of the steel in the ladle, slowly pouring additional steel in a stream from the converter to the ladle, treating the said steel with recarburizing and deoxidizing reagents by adding the said reagents to the stream of steel being poured from the converter, timing the addition of reagents to the pouring so that a substantial amount of steel still remains in the converter after complete addition of the reagents to the steel in the ladle, interrupting the pouring upon complete addition of the reagents, poling the steel in the ladle by introducing green saplings therein, and thereafter rapidly pouring into the ladle the remaining steel from the converter to establish thorough mixing thereof with the steel in the ladle, the amount of petroleum coke and reagents being proportioned so as to maintain the carbon in the final steel from substantially 0.14 per cent to 0.16 per cent.

7. The process of preparing Bessemer steel for the production of seamless tubes, which comprises blowing in a converter a charge composed of from approximately 34,000 to 35,000 pounds of molten pig iron which will result in a sulphur content in the finished steel of less than 0.035 per cent, until the carbon content of the resulting steel is reduced to substantially 0.04 per cent, pouring the steel from the converter into a ladle until the ladle contains a small quantity thereof, adding approximately 18 pounds of petroleum coke to the said steel in the ladle, adding further quantities of steel and petroleum coke to the ladle, the said coke being added in three separate installments of approximately 18 pounds each, to effect a preliminary substantially complete deoxidation of the steel in the ladle, slowly pouring additional steel in a slow stream from the converter to the ladle, adding to the said ladle approximately 225 pounds of 80 per cent ferro-manganese, 70 pounds of 90 per cent ferro-silicon, and 65 pounds of aluminum, all additions being added to the stream of metal issuing from the converter and in such manner as to prevent entrapment in the ladle slag, timing the addition of the reagents to the pouring so that a substantial amount of steel remains in the converter after complete addition of the reagents to the steel in the ladle, interrupting the pouring upon complete addition of the said reagents, poling the steel in the ladle by introducing green saplings therein, and thereafter quickly pouring into the ladle the remaining steel from the converter to establish thorough mixing thereof with the steel in the ladle, the amount of petroleum coke and reagents being proportioned so as to control the carbon in the final steel to be from substantially 0.10 per cent to 0.50 per cent, together with from approximately 0.180 per cent to 0.230 per cent silicon, not more than substantially 0.035 per cent sulphur and not more than substantially 0.075 per cent phosphorus.

PEER D. NIELSEN.